United States Patent [19]

Mehalek

[11] 4,432,023
[45] Feb. 14, 1984

[54] RASTER SCANNER CONTROL

[75] Inventor: Glenn M. Mehalek, Penfield, N.Y.

[73] Assignee: Xerox Corporation, Stamford, Conn.

[21] Appl. No.: 316,468

[22] Filed: Oct. 30, 1981

[51] Int. Cl.$^3$ .............................................. H04N 1/12
[52] U.S. Cl. ................................. 358/293; 358/288
[58] Field of Search ............... 355/8, 11, 51; 358/293, 358/288

[56] References Cited

U.S. PATENT DOCUMENTS

| | | | |
|---|---|---|---|
| 3,637,303 | 1/1972 | Komori et al. | 355/8 |
| 3,834,805 | 9/1974 | Griffin, Jr. | 355/8 |
| 4,070,089 | 1/1978 | Grafton | 350/7 |
| 4,129,377 | 12/1978 | Miyamoto et al. | 355/14 |
| 4,161,359 | 7/1979 | Masham | 355/8 |
| 4,296,441 | 10/1981 | Ogasawara | 358/293 |
| 4,367,493 | 1/1983 | Matteson | 358/288 |

Primary Examiner—Howard Britton
Attorney, Agent, or Firm—Frederick E. McMullen

[57] ABSTRACT

A raster input scanner particularly adapted for asynchronous operation for scanning a document original one line at a time in response to an external command. A document feed roll with step motor driver is provided to step the document across a scan slit one line at a time. To avoid the delay imposed while waiting for the document to come to a stop after each step, a control actuates the array to scan the document line at the same instant that the step motor is actuated whereby scanning occurs during the interval while the document is being accelerated by the feed roll.

4 Claims, 4 Drawing Figures

DOCUMENT MOTION AT N STEP/SECOND

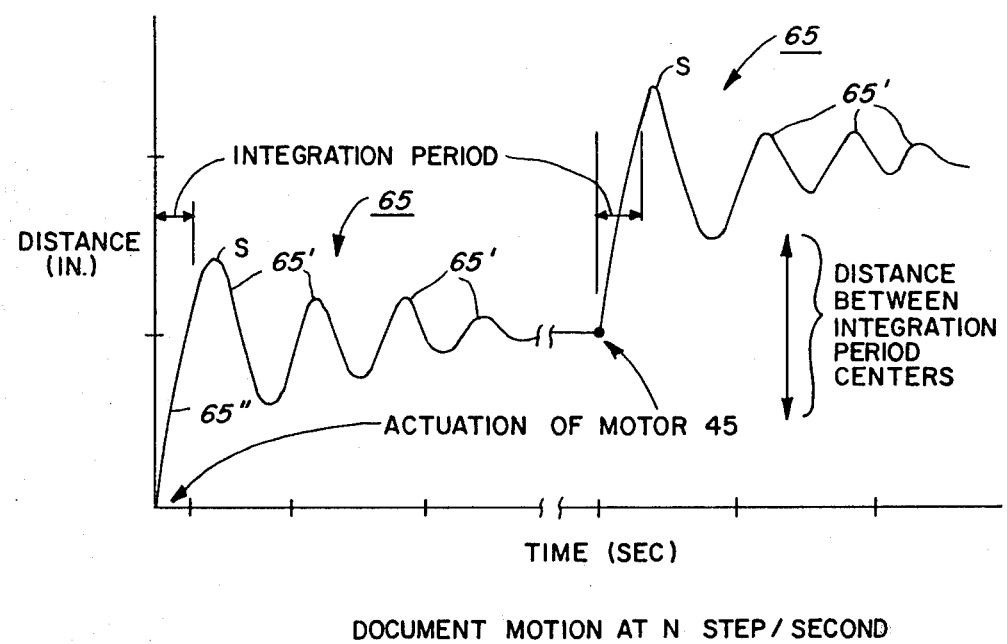

RASTER SCANNER CONTROL

The invention relates to a raster scanning apparatus, and more particularly to a raster scanning apparatus incorporating an improved control for the apparatus scanning array.

The typical raster input scanner is called upon to produce video image signals in asynchronous fashion scanline by scanline in response to an external request. The aforementioned scanner typically has a slit-like scanning aperture extending across the width of a platen, the latter serving to support the document original to be scanned during the scanning process. One or more lamps cooperate with discrete optical elements to transmit a wedge-like beam of image rays reflected from the document through the scanning aperture to one or more linear scanning arrays. Since in scanners of this type scanning takes place on a line by line basis, a document transport is provided to index or step the document forward over the scanning aperture one line at a time.

Obviously, stepping motion of the document must be carried out with utmost accuracy if a faithful and complete representation of the document image is to be captured. And since high scanner throughput speeds are desirable, which may for example result in up to 400 steps per second, delays imposed by acceleration and deceleration of the document must be reduced to an absolute minimum.

One manner of accomplishing the necessary stepping action at the high speeds desired is to use a permanent magnet type step motor to operate the document transport which may for example consist of a feed roll coupled to the step motor via a reduction drive. However, it has been found that apparatus of this type requires a short period to settle after each step forward. As a result, the document does not stop instantly at the end of each step pulse but instead decelerates in uneven and largely uncontrolled steps during a finite interval before coming to a complete stop. This in turn can delay initiation of the scanning cycle while waiting for document motion to stop which as will be understood had the adverse effect of reducing and limiting scanner throughput speeds.

The invention is intended to correct or at least alleviate the aforedescribed problem. The invention provides a method of scanning a document line by line comprising the steps of: stepping the document to be scanned ahead one line at a time; simultaneously scanning a line of the document as the document is being accelerated during the initial part of the stepping movement to avoid delay while waiting for the document to come to a stop; and repeating the foregoing steps for subsequent scanlines.

The invention further provides a raster scanner comprising in combination: a scan slit through which a document may be scanned line by line by a scanning array; stepping means for advancing the document across the slit in step-like fashion; and control means for simultaneously actuating the stepping means and the scanning array to scan the next document line during a period of uniform document acceleration thereby avoiding nonuniform document movement following cessation of the step pulse or incurring a delay while waiting for the document to come to a stop before scanning.

IN THE DRAWINGS

FIG. 4 is a graphical representation of typical document motion during a step cycle.

Figure 1:
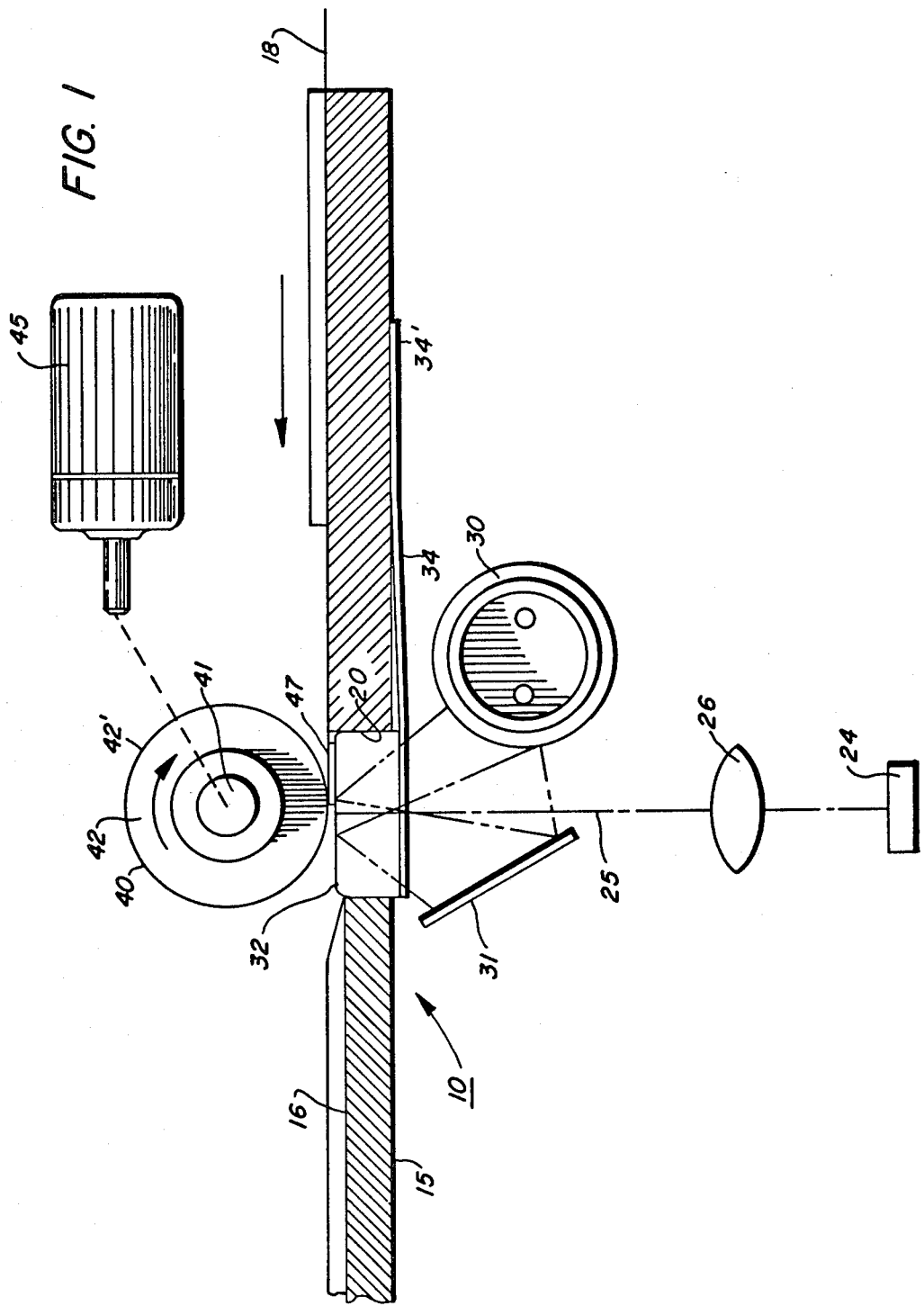
FIG. 1 is a schematic view of a raster input scanner incorporating the scanning control of the present invention.

Referring to FIG. 1 of the drawings, there is shown a raster input scanner 10 incorporating the scanning control of the present invention. As will appear, the scanning control of the present invention permits scanner 10 to respond to asynchronous demands for image signals such as may result from situations wherein the communication channel served by scanner 10 has a restricted capacity, or where scanner 10 serves a disc memory whose rate of data acceptance is less than the rate at which scanner 10 generates image signals, or to accommodate off-peak transmittal, or operator interruptions, etc. without sacrificing the quality and faithfulness of the image signals produced.

Scanner 10 includes a surface forming means in the form of platen 15 having a relatively flat surface 16 across which documents 18 to be scanned are moved in the direction shown by the solid line arrow. A slit-like scanning aperture 20 is provided in the platen 15, the longitudinal axis of aperture 20 extending in the direction substantially perpendicular to the direction of movement of the document 18.

A suitable array 24 such as a Fairchild Corporation Model 121-H linear array is provided for scanning the document image line by line as the document is indexed or stepped across aperture 20. Array 24 is disposed so that the scanning axis thereof is substantially parallel to the axis of scanning aperture 20. The optical path between scanning aperture 20 and array 24 includes a lens 26 for focusing the document line viewed by array 24 through aperture 20 onto the array 24. A lamp 30, disposed below platen 15 and to one side of the optical centerline 25, illuminates the aperture area in the document image area thereover. To enhance illumination, a reflector 31 is disposed on the other side of the optical path across from lamp 30, reflector 31 serving to reflect light emitted by lamp 30 into the aperture area. While a single array 24 is shown and described herein, it will be understood that array 24 may consist of a composite of several arrays.

A combination support-viewing element 32 which is formed from any suitable transparent material such as glass is movably disposed within the scanning aperture 20. Viewing element 32 is mounted on a pair of leaf springs 34. Springs 34, the longitudinal axis of which extends in a direction substantially parallel to the direction of movement of the document to be scanned to reduce perturbations in the document feed, have the remote ends 34' thereof secured as by cementing to the underside of platen 15. As will be understood, leaf springs 34 bias viewing element 32 upwardly and into the confines of scanning aperture 20.

A document transport has a document feed roll 40 rotatably mounted on support member 15 above scanning aperture 20 and the viewing element 32 therein, such that the periphery 42' of the roll 40 contacts the upper surface of viewing element 32 at a point just upstream of the optical centerline 25. A low friction surface 47 is preferably provided on viewing element 32 to control frictional loading on feed roll 40. As will appear, feed roll 40 serves to step the document to be scanned along platen 15 and across the viewing element 32 one line at a time. In the example shown, feed roll 40 comprises an internal core member or shaft 41, normally metal, having a rubber sleeve 42 thereabout. Sleeve 42 is preferably formed from a relatively hard durometer rubber material to assure uniform friction and provide long life. The remote ends of shaft 41 of roll 40 are rotatably journaled by suitable bearings (not shown) mounted on the sides of platen 15. A step motor 45 is coupled to shaft 41 as by means of pulleys and belt (not shown), motor 45 serving to step feed roll 40 in the direction shown by the solid line arrow upon actuation thereof.

As will be understood, springs 34 hold viewing element 32 in resilient contact with the periphery of feed roll 40, roll 40 and viewing element 32 cooperating to form a nip between which the document 18 to be scanned passes. The bias provided by springs 34 permits transport to accommodate documents of varying thickness without velocity changes.

Figure 2:
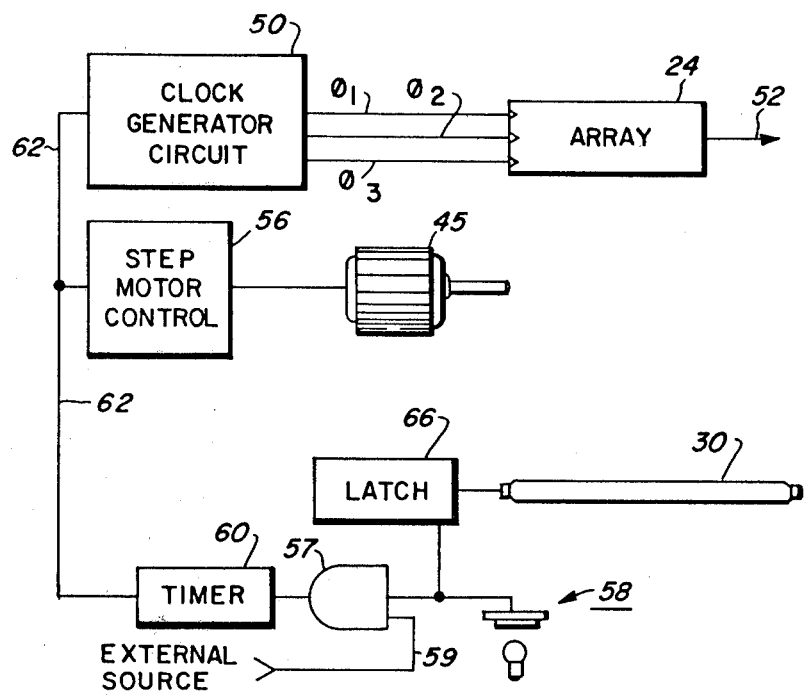
FIG. 2 is a logic circuit diagram showing details of the scanning control of the present invention.
Figure 3:
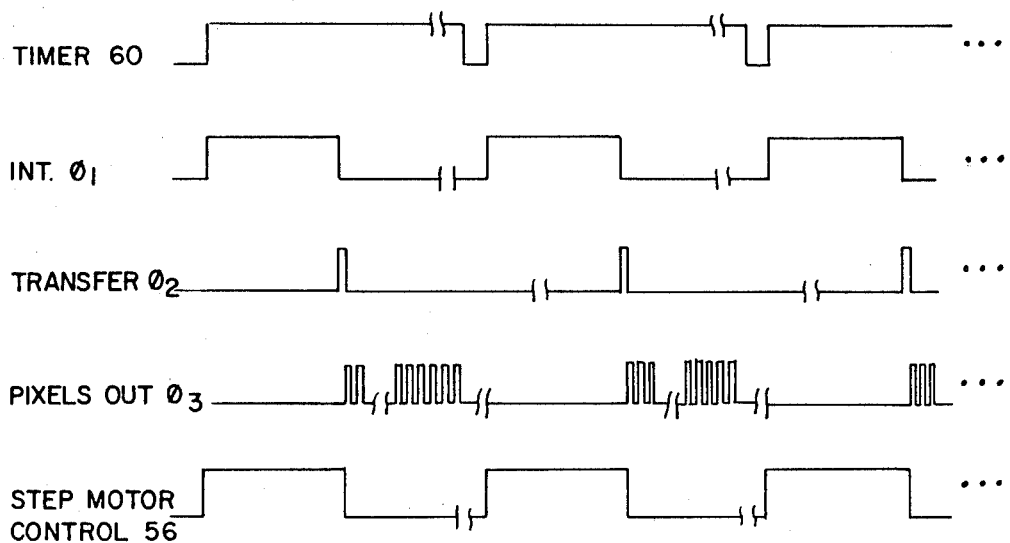
FIG. 3 is a timing chart showing the operating sequence of the scanning control of the present invention.

Referring particularly to FIGS. 2 and 3, a suitable clock generator circuit 50 is provided for generating clock pulses $\phi_1$, $\phi_2$, $\phi_3$ for operating scanning array 24. As seen in FIG. 3, clock pulse $\phi_1$ defines the integration period during which the array photosites view the image, clock pulse $\phi_2$ the transfer period during which the charges accumulated on the array photosites are transferred to one or more on-board parallel in-serial out shift registers, and clock pulses $\phi_3$ provide the pulses to clock the image signals or pixels in serial fashion from the array shift register or registers to output line 52.

A suitable step motor control 56 is provided for operating step motor 45, control 56 serving when triggered to actuate motor 45 to rotate feed roll 40 and step the document to be scanned forward for a distance of one scanline. A suitable sheet edge sensor 58, which may for example comprise a cooperating photocell and light disposed so that sensor 58 is actuated when the document to be scanned reaches the optical centerline 25, is provided, the output of sensor 58 being coupled through gate 57 to the control input of a suitable timer 60, and to lamp control latch 66. Gate 57 is enabled through lead 59 in response to a demand for image signals from the external source served by scanner 10. Latch 66, when set by a signal from sensor 58 in response to the presence of a document, energizes lamp 30. Timer 60 has the output terminal thereof coupled to the control input terminal of clock generator circuit 50 and step motor control 56 by lead 62. Timer 60 comprises any suitable timing mechanism such as a crystal controlled clock capable when triggered by the signal output of sensor 58 of generating a series of timed pulses in lead 62 for actuating step motor control 56 and operating scanning array 24 as will appear.

Referring particularly to FIG. 4 of the drawings, there is illustrated an exemplary wave pattern 65 depicting typical motion of document 18 during each step cycle. As can be seen, on actuation of step motor 45, the document 18 is accelerated by feed roll 40 at a relatively constant rate (shown by wave segment 65'') from a standing start to a maximum speed S. From this point, step motor 45 normally overshoots the position of the next scanline (i.e. the desired position) following which the inertia of the various parts, i.e. feed roll 40, step motor 45, etc., sustains a somewhat oscillatory or uneven document movement at a steadily decreasing amplitude until the document comes to a stop at the desired position. This latter document motion is illustrated by the wave portion 65' in FIG. 4.

To avoid the necessity of waiting until the document 18 comes to a stop and to obviate any distortions in the image signal output of scanning array 24 due to scanning a document while the document is in uncontrolled motion, scanning array 24 is actuated simultaneously with actuation of step motor 45 by triggering clock generator circuit 50 concurrently with step motor control 56. As a result, the array integration period is initiated by the clock pulse $\phi_1$ from clock circuit 50 as feed roll 40 begins to advance the document 18 forward. Integration of the image line by scanning array 29 accordingly takes place during the period when the document is being accelerated by feed roll 40 at a relatively constant rate, i.e. during segment 65'' of wave pattern 65. Following the integration period, the image charges are transferred to the array onboard shift register or shift registers by the transfer pulse $\phi_2$ and the image signals thereafter output by the clock pulses $\phi_3$. Array charge transfer and image signal output, which are independent of document movement, are accordingly carried out between acceleration impulses.

OPERATION

In operation, the document 18 to be scanned is inserted into the nip formed by viewing element 32 and feed roll 40 by suitable means, for example by hand. As the leading edge of the document moves into the nip formed by element 32 and roll 40 and across centerline 25, sensor 58 responds to actuate timer 60 and set lamp control latch 66. Setting of latch 66 energizes lamp 30.

On an external demand for data, gate 57 is enabled to trigger timer 60. Timer 60 commences to generate a succession of timed control pulses in lead 62, each timed pulse serving to trigger step motor control 56 and actuate step motor 45 through one step. At the same time, the control pulses output by timer 60 trigger clock generator circuit 50. Actuation of motor 45 rotates feed roll 40 through a predetermined arc to index or step the document 18 ahead one line while the clock signals $\phi_1$, $\phi_2$, $\phi_3$ output by clock generator circuit 50 operate scanning array 24 in the sequence described to scan the image line.

The foregoing step cycle process is repeated line by line. Following scanning of the last line, movement of the document trailing edge past the optical centerline 25 resets sensor 58 to terminate operation of scanner 10.

While the invention has been described herein in conjunction with a document transport arrangement for stepping the document to be scanned past an array, other step scanning arrangements, i.e. a scanning or moving platen; or moving lens, or mirror(s), or array, or combination thereof; etc. may be readily contemplated.

While the invention has been described with reference to the structure disclosed, it is not confined to the details set forth, but is intended to cover such modifications or changes as may come within the scope of the following claims.

I claim:

1. The method of controlling an asynchronously operated scanner having step means for producing line by line scanning motion between a document to be scanned and at least one linear scanning array, the steps which comprise:

(a) on a demand for image signals, actuating said step means to step said document one line and start scanning motion between said document and said array;

(b) simultaneously with each actuation of said step means and start of said scanning motion, actuating said scanning array to commence scanning of the document line viewed by said array as said step means is actuated and scanning motion of said document begins and (c) deactuating said array when scanning of said document line is completed while scanning motion of said document continues as said step means completes stepping of said document through one line.

2. In a raster scanner with scan slit through which a document may be scanned line by line by a scanning array, the combination of:

(a) a step motor for advancing the document across the slit in step-like fashion, and (b) control means for simultaneously actuating the step motor and scanning array once for each document line scanned so that each document line is scanned during a period of uniform document acceleration, thereby avoiding non-uniform document movement following cessation of the step pulse or incurring a delay while waiting for the document to come to a stop before scanning.

3. In a raster scanner, the combination of:

(a) a platen for supporting a document to be scanned, said platen having a slit-like aperture therein to permit at least one line of said document to be viewed;

(b) lamp means to illuminate said aperture and the document line at said aperture;

(c) at least one scanning array for viewing said aperture and the document line at said aperture, said array when actuated converting the document image line viewed by said array to image signals;

(d) document transport means for moving said document across said aperture;

(e) a step motor for driving said document transport means in steps of one scanline each; and (f) control means for simultaneously actuating said step motor and said array, said step motor causing said document transport means to advance said document one step at a time, said array scanning each document line at said aperture once during the time said document is being accelerated for each step by said document transport means whereby each document line is scanned by said array during substantially uniform accelerating movement of said document, said control means deactuating said array following one scan of each line by said array, said document continuing to move following deactuating of said array as said document transport coasts toward a stop prior to simultaneous reactuation of said step motor and said array to step the document through the next step and scan the next line.

4. The scanner according to claim 3 including means to trigger said control means on a demand for image signals.

* * * * *